UNITED STATES PATENT OFFICE.

WALTER P. JENNEY, OF NEW YORK, N. Y.

IMPROVEMENT IN RESINOUS SUBSTANCES.

Specification forming part of Letters Patent No. 178,154, dated May 30, 1876; application filed January 6, 1876.

*To all whom it may concern:*

Be it known that I, WALTER P. JENNEY, of the city, county, and State of New York, have invented a new and useful Manufacture or Resinous Substance, which I fully set forth in the following specification, describing the properties or qualities of the new substance, and the process by which it is produced, as follows:

In the purification of hydrocarbon oils produced by the distillation of crude petroleum, asphalts, or bitumens, or by the destructive distillation of coal, resins, or bituminous shales, the oils are agitated with two per cent., or more, of concentrated sulphuric acid, (66° Baumé, 1.86 specific gravity,) in order to remove certain oils contained in the distillate, which would, in course of time, absorb oxygen from the air, and cause the oil to become dark colored and gummy, and also to remove tarry substances and the disagreeable odor. Sulphuric acid combines chemically with these bodies and dissolves them, forming a dark-red heavy liquid, which settles on the bottom of the agitator, and can then readily be drawn off from the purified oil. This peculiar compound of sulphuric acid and hydrocarbon oils, dissolved in the excess of acid, is known as sludge. At present it is purchased by superphosphate manufacturers, who mix it with a little water, which decomposes the compound of acid and oil, producing a weaker acid, (about 50° Baumé,) used in the manufacture of superphosphate of lime, and a dark-colored offensive oil, which rises to the surface of the acid, and usually is thrown away, no commercial use having been found for it. This waste product is called "sludge-oil."

My invention consists in producing from this sludge-oil, or other substantially equivalent substance, a new manufacture or resinous substance.

The mode of practicing my invention is as follows: After the sludge has been washed with petroleum-naphtha, to remove any illuminating-oils mixed with it, and the sludge has been decomposed by the addition of water, the sludge-oil is drawn off, and then purified by repeated washings with water until the acid remaining in it is removed. For this purpose equal volumes of water and sludge-oil may be used, but the washing can be effected by a less quantity of water. The remaining oil is then neutralized by quicklime or caustic soda. The purified oil has a strong and somewhat disagreeable odor, and contains about ten per cent. of volatile oils, which are converted into a hard resin, with difficulty, to remove these volatile substances. Sludge-oil thus purified is introduced into a still, with the addition of from two to four per cent. of caustic soda, or caustic soda and about two per cent. of the oxides of lead or manganese, to oxidize any sulphur in the oil, and combine with it, and steam is then blown through the oil, the oil being kept hot either by a fire under the still, or by the use of steam heated to the required temperature, between 212° Fahrenheit and 450° Fahrenheit. The action of the steam is continued until no more volatile oils are removed, usually from five to ten hours. The steam is then shut off, and the contents of the still allowed to settle, when a sediment of tarry impurities and soda subsides, from which the pure oil may be drawn off. The oil is then introduced into a still or tank, and oxidized by blowing currents of air through it, the oil being kept at a temperature of from 100° Fahrenheit to 300° Fahrenheit, either by a slow fire under the still, or by a steam-coil in the bottom of the tank, or by heating the air in the hot-blast oven, or otherwise, to the proper temperature before it is blown through the oil; and the action of the air is continued until a sample taken from the contents of the converting-vessel is, on cooling, found to be a resinous substance of a greater or less hardness or consistency, as may be required for the particular purpose to which it is to be applied; and after letting the contents of the still settle, the hot resin is drawn off from the sediment of soda and impurities.

The time required to effect the oxidation of the sludge-oil varies with the working temperature, and with the extent of surface of oil brought into contact with the air. I may define it as between four and twelve days generally, but by an excessive use of air the time may be shortened to even less than four days. The action of the air may be accelerated by adding about two per cent. of the oxides of lead or manganese, or about two per cent. of the manganates of soda and potassa to the oil. These substances act either by giving up oxygen to the oil, or by their presence inducing a combination of the oxygen and the hydrocarbon.

An inferior quality of this resinous substance may be produced by treating the washed sludge-oil in a still with caustic soda and litharge, (five per cent. soda to one to five per cent. litharge,) and blowing a current of air through it at about a temperature of 350° Fahrenheit, which at the same time oxidizes the oil, and removes the more volatile portions, which are distilled off until it is converted into a resinous substance of the required hardness. This process last mentioned requires from two to six days, but the resin produced is of a darker color than that made by first treating with steam, and then with air at a lower temperature, as the coloring matter is not effected by steam at 400°, while air at that temperature rapidly darkens it by oxidation. Sunlight bleaches the color of sludge-oil, and at the same time greatly accelerates the absorption of oxygen from the air. To produce the lightest-colored resin the sludge-oil is steamed with five per cent. of soda, 20° Baumé, at a low temperature, about 200° to 250° Fahrenheit, for ten hours, to remove the more volatile portions, and then oxidized and bleached by exposing the oil in shallow tanks covered by glass to the action of sunlight, the oil being kept hot and fluid by a steam-coil in the bottom of the tank, and currents of air blown through it to produce the oxidation. The working temperature in this case should not exceed 250° Fahrenheit.

Inferior qualities of sludge-oil, as those produced in the purification of lubricating-oils, and which contain a large quantity of tarry substances, are treated as follows: The oil is charged into a still and caustic soda and black oxide of manganese (in the proportion of about five per cent. of soda and two per cent. of manganese) are added, and the charge distilled by a current of steam blown through the oil, assisted by a fire under the still, until only tar and coke remain behind. The distillation commences at about 350° Fahrenheit, and the fire being increased the temperature in the still gradually rises to about 800°, when only the thick pitch remains in the still. By the use of steam under pressure, especially when superheated, the oil can be distilled with scarcely any decomposition, and the distillate, which is of a yellow or light red color, can be converted into a superior light-colored resinous substance by oxidizing it with currents of air at the lowest possible working temperature.

The resin produced by this oxidation of sludge-oil is distinguished from all other known resins and resinous substances whatsoever by its behavior with different chemicals and solvents. It varies in color from yellow to dark garnet red, according to the method of its production. It is hard, brittle, and odorless at ordinary temperatures when oxidized as completely and thoroughly as possible. It is tasteless, insoluble in, and not acted upon by, water, caustic soda, potassa, or ammonia, even when heated. Alcohol of ninety-five per cent. dissolves but small quantities of this resin even when boiled with it. It may be considered practically insoluble in alcohol. Petroleum-naphtha dissolves it very rapidly without the aid of heat. Spirits of turpentine readily dissolve it, especially on warming. Ether, benzole, chloroform, and bisulphide of carbon all dissolve the resin. A mixture of ether and alcohol, in the proportion of two parts of ether and one part of alcohol, quite readily dissolves this resinous substance, but not so readily as pure ether. Linseed-oil and olive-oil dissolve the resin when heated with it. Concentrated sulphuric acid dissolves it completely. The resin separates again on adding water. Nitric acid attacks it violently, and converts it into a brown, tarry, or gummy substance, having a pleasant, peculiar odor. Hydrochloric acid seems to have little or no action on it.

It is well known that it has been proposed to use sludge-oil as a paint-oil, but this has not been attended with practical success.

I do not wish to be understood as laying any claim in this case to the process by which my improved resin is obtained, as that forms the subject of another case filed by me.

This resin, when dissolved and mixed with suitable solvents, produces a varnish having novel and characteristic properties. I do not claim in this application such varnish, as that is made the subject of another application by me now pending, and to which I refer for a more particular description of said varnish.

What I claim as my invention, and desire to secure by Letters Patent, is—

The new manufacture or substance hereinbefore described, derived from sludge-oil by a process of oxygenation, and possessing the substantial properties herein described, among which are that it is a solid substance of greater or less consistency or hardness, has a resinous appearance, and is not acted upon by the specified alkalies.

WALTER P. JENNEY.

Witnesses:
PHILLIPS ABBOTT,
BARON HIGHAM.